No. 640,592. Patented Jan. 2, 1900.
J. RUSK.
DRAFT EQUALIZER.
(Application filed Apr. 22, 1899.)
(No Model.)
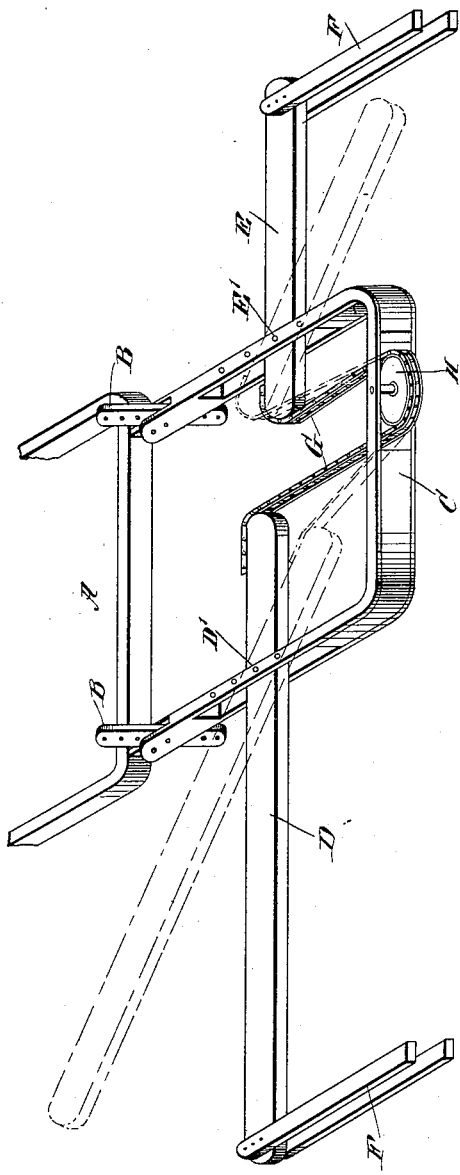
WITNESSES:
INVENTOR
John Rusk.
BY
ATTORNEYS.

UNITED STATES PATENT OFFICE.

JOHN RUSK, OF CHENEYVILLE, ILLINOIS.

DRAFT-EQUALIZER.

SPECIFICATION forming part of Letters Patent No. 640,592, dated January 2, 1900.

Application filed April 22, 1899. Serial No. 714,035. (No model.)

*To all whom it may concern:*

Be it known that I, JOHN RUSK, of Cheneyville, in the county of Vermilion and State of Illinois, have invented a new and Improved Draft-Equalizer, of which the following is a full, clear, and exact description.

The object of the invention is to provide a new and improved draft-equalizer which is simple and durable in construction, very effective in operation, and arranged to prevent all undue side draft when in use on gang-plows for three, four, or more horses.

The invention consists of novel features and parts and combinations of the same, as will be fully described hereinafter and then pointed out in the claims.

Reference is to be had to the accompanying drawing, forming a part of this specification, in which the figure is a perspective view of the improvement.

The plow or other farming implement on which the equalizer is used is provided with a beam A, carrying at its front end the clevises B, on which is pivoted and held vertically adjustable a U-shaped frame C, having its side arms slotted transversely for the free working of the equalizing-levers D and E, both pivoted to the side arms of the frame at D' and E', respectively. Hitching-straps or other devices F are connected with the outer ends of the equalizing-levers D and E, and the inner ends of said levers are connected with the ends of a chain, rope, belt, or other flexible connection G, which extends around a pulley H, disposed horizontally, and journaled in the front end of the frame C in such a manner that the equalizing-levers D and E, the flexible connection G, and the pulley H are located in about the same horizontal plane.

The equalizing-levers D and E, by having a flexible connection with each other, as described, work in unison, and said levers are of different lengths—that is, the lever D is preferably twice as long as the lever E, and the fulcrums of said levers are so disposed that an equal draft is obtained on the outer ends of the different-sized levers. For instance, if the lever D is forty inches long and the lever E is twenty inches long, then the pivots D' and E' are so arranged that the inner end of the lever D is ten inches long and the inner end of the lever E is five inches long, and consequently the pull on the outer ends of the levers is equalized—that is, the same draft at the outer ends of the levers is obtained, and the hitch is set to the left about seven and a half inches to prevent any and all undue side draft.

By having the frame C vertically adjustable on the clevises it may be raised or lowered to bring it in proper position relatively to the height of the plow-beam from the ground and the height of the pull of the horses. The pivots for the levers D and E are preferably adjustable in the sides of the frame C to permit of readily adjusting the levers according to the length of the flexible connection.

The equalizer, on account of being in sections, can be hitched very close, and the short lever E is preferably disposed somewhat farther in the front of the frame than the long lever D to lighten the draft on the short lever as much as possible.

Having thus fully described my invention, I claim as new and desire to secure by Letters Patent—

1. A draft-equalizer, comprising a frame pivoted on the plow and made U-shaped in form, the sides and front being formed with slots, levers of different lengths and extending through the said slots and pivoted to the sides of the frame, the pivots being so arranged relatively to each other as to insure an equal draft on the outer ends of the levers, a flexible connection for the inner ends of the said levers, and a pulley extending in the slot at the front end of the frame and journaled in said front end, said flexible connection passing over said pulley, substantially as shown and described.

2. In a draft-equalizer, the combination of a U-shaped frame adapted to be attached at its ends to the object to be drawn, an equalizing-lever fulcrumed on each longitudinal member of the frame, a sheave mounted on the transverse member of the frame, and a flexible connection between the ends of the levers and passing over the sheave.

3. In a draft-equalizer, the combination of a frame adapted to be attached to the object to be drawn, the frame having longitudinal and transverse members, levers fulcrumed on the longitudinal members, a sheave mounted on the transverse member, and a flexible connection attached to the levers and passed around the sheave.

JOHN RUSK.

Witnesses:
WM. J. PARK,
EMILY E. GLOVER.